United States Patent [19]

Prevorsek et al.

[11] Patent Number: 4,565,850

[45] Date of Patent: Jan. 21, 1986

[54] THERMOPLASTIC COMPOSITION CONTAINING NEMATIC OLIGOMER

[75] Inventors: Dusan C. Prevorsek, Morristown; Murali K. Akkapeddi, Morris Plains, both of N.J.

[73] Assignee: Allied Corporation, Morris Township, Morris County, N.J.

[21] Appl. No.: 471,934

[22] Filed: Mar. 3, 1983

Related U.S. Application Data

[63] Continuation of Ser. No. 289,619, Aug. 31, 1981, abandoned.

[51] Int. Cl.[4] .................. C08L 59/00; C08L 67/02; C08L 77/00; C08L 69/00
[52] U.S. Cl. .................. 525/425; 525/432; 525/439; 525/444
[58] Field of Search .......... 525/425, 444, 432, 439

[56]  References Cited

U.S. PATENT DOCUMENTS

| | | | |
|---|---|---|---|
| 3,413,379 | 11/1968 | Schade | 525/444 |
| 3,890,256 | 6/1975 | McFarlane et al. | 260/47 C |
| 3,991,013 | 11/1976 | Pletcher | 260/47 C |
| 4,052,481 | 10/1977 | Asahara | 525/425 |
| 4,066,620 | 1/1978 | Kleinschuster et al. | 260/47 C |
| 4,075,262 | 2/1978 | Schaefgen | 260/860 |
| 4,118,372 | 10/1978 | Schaefgen | 528/190 |
| 4,140,846 | 2/1979 | Jackson, Jr. et al. | 528/193 |
| 4,156,070 | 5/1979 | Jackson, Jr. et al. | 528/191 |
| 4,171,330 | 10/1979 | Kyo | 525/425 |
| 4,206,100 | 6/1980 | Kyo | 525/425 |
| 4,246,381 | 1/1981 | Robeson | 525/444 |
| 4,254,242 | 3/1981 | Kyo | 525/425 |
| 4,258,154 | 3/1981 | Kyo | 525/425 |
| 4,259,458 | 3/1981 | Robeson | 525/444 |
| 4,286,075 | 8/1981 | Robeson | 525/444 |
| 4,386,174 | 5/1983 | Cogswell | 525/425 |
| 4,460,735 | 7/1984 | Froix | 524/537 |

FOREIGN PATENT DOCUMENTS

| | | | |
|---|---|---|---|
| 0041327 | 9/1981 | European Pat. Off. | |
| 0044175 | 1/1982 | European Pat. Off. | 525/439 |
| 54-101852 | 8/1979 | Japan | 525/425 |
| 54-132652 | 10/1979 | Japan | 525/444 |
| 55-13766 | 1/1980 | Japan | 525/425 |
| 55-50057 | 4/1980 | Japan | 525/425 |
| 56-14698 | 4/1981 | Japan | 525/444 |
| 2040973 | 9/1980 | United Kingdom | 525/444 |

OTHER PUBLICATIONS

M. Takayanagi et al., *J. Macromol. Sci.,-Phys.*, B17(4), (1980), pp. 591–615.

M. Wellman et al., Division of Coating and Plastics Preprints, American Chem. Soc., vol. 43, (1980), pp. 783–787.

*Primary Examiner*—Allan M. Lieberman
*Attorney, Agent, or Firm*—Richard C. Stewart, II; Gerhard H. Fuchs

[57]  ABSTRACT

A thermotropic oligomer such as a polyester is blended with a high molecular weight thermoplastic polymer such as poly(ethylene terephthalate) to raise the modulus value of the composition compared to the polymer alone, especially at the glass transition temperature of the polymer and above.

20 Claims, No Drawings

THERMOPLASTIC COMPOSITION CONTAINING NEMATIC OLIGOMER

This application is a continuation, of application Ser. No. 289,619, filed Aug. 31, 1981, now abandoned.

BACKGROUND OF THE INVENTION

The present invention relates to thermoplastic compositions, and especially to compositions containing a crystallizable thermoplastic which is itself isotropic (non-liquid crystalline) with an oligomeric thermotropic (liquid crystalline in the melt) additive.

Various additives have been proposed to crystallizable isotropic thermoplastics such as polyamides (e.g. nylon 6) and polyesters (e.g. poly(ethylene terephthalate)) which are intended to improve the physical properties of fibers or films found therefrom. Such additives include inorganic materials, small organic compounds and large polymers with which the isotropic thermoplastic is coextruded or otherwise blended. With the discovery of thermotropic polyesters, as described, for example, in U.S. Pat. Nos. 4,140,846 to Jackson, Jr. et al. (Feb. 20, 1979), 3,890,256 to McFarlane et al. (June 17, 1975), 3,991,013 to Pletcher (Nov. 9, 1976), 4,066,620 to Kleinschuster et al. (Jan. 3, 1978), 4,075,262 to Schaefgen (Feb. 21, 1978), 4,118,372 to Schaefgen (Oct. 3, 1978) and 4,156,070 to Jackson, Jr. et al. (May 22, 1979), some proposals have been made to blend these materials with isotropic polymers. Unfortunately, thermotropic polymers have thus far proved incompatible with isotropic polymers, with the heterogeneous blends that are formed exhibiting properties no better than the isotropic polymers alone.

In particular, M. Takayanagi et al. in *J. Macromol. Sci, - Phys.,* B17(4), pp. 591–615 (1980) report attempts to blend nylon-6 or nylon-66 with wholly aromatic polyamides such as poly-p-benzamide or their block copolymers with nylon-6 or nylon-66. The wholly aromatic polyamides used are infusible.

M. Wellman et al., Division of Coating and Plastics Preprints, American Chem. Soc., vol 43, pp 783–87 (1980) report blending of rod-like polymers with similar coil-like polymers, both having monomers with fused ring structures (e.g. poly-para-phenylene benzobisthiazole and poly-2,5(6) benzimidazole). Again the rigid polymer is infusible.

BRIEF DESCRIPTION OF THE INVENTION

It has been discovered that thermotropic oligomers are compatible to some extent with isotropic crystallizable polymers, and that mixtures of the two do form fibers, and presumably other fabricated forms such as films, with improved properties compared to the isotropic polymer alone. These improved properties result even when microscopic evaluation shows substantial heterogeneity.

Accordingly, the present invention includes a thermoplastic composition comprising:
(a) a thermoplastic polymer of high molecular weight which has a fusion temperature at a first temperature, has a glass transition temperature and forms an isotropic liquid above the first temperature, and
(b) dispersed in said thermoplastic polymer an oligomer having a melting point at a second temperature, said second temperature being not more than 50° C. less than said first temperature, nor more than 70° C. more than said first temperature; said oligomer exhibiting thermotropic behavior between said second temperature and a third temperature and said third temperature being at least 30° C. above said second temperature and at least 10° C. above said first temperature; said oligomer having a length/diameter ratio (L/D) of at least 10, a glass transition temperature at least 10° C. greater than the glass transition temperature of said polymer and a Small's solubility parameter within 2 of the Small's solubility parameter of said polymer;
the amount of said oligomer being sufficient to raise the modulus value of the thermoplastic composition to at least 110% of the corresponding value of the polymer at the glass transition temperature of said polymer.

DETAILED DESCRIPTION OF THE INVENTION

The present invention includes thermoplastic compositions of a thermoplastic polymer and a thermotropic oligomer. The thermotropic oligomer differs from the rod-like reinforcing materials of Takayanagi et al. and Wellman et al in being fusible (i.e. having a melting point as specified in the Brief Description). The salient features of the oligomer are its melting point, its temperature range for thermotropic behavior, its glass transition temperature and its Small's solubility parameter (as described below).

The oligomer should have a melting point (the second temperature) reasonably close to the fusion temperature of the polymer (the first temperature). The second temperature may be up to about 70° C. more or 50° C. less than the first temperature, but is preferably no more than about 20° C. more or 20° C. less than the first temperature.

The oligomer should exhibit thermotropic behavior, i.e. liquid crystalline or anisotropy in the melt, between the second temperature and a third temperature. Thus the second temperature represents a transition between the solid state and the nematic liquid crystalline state. The third temperature should be at least 30° C. above the second temperature and at least 10° C. above the first temperature. That is, for example, if the polymer's fusion temperature is 250° C. and the oligomer's melting point is 270° C., thermotropic behavior should be exhibited by the oligomer between 270° C. and 300° C. If, however, the polymer's fusion temperature is 250° C. and the oligomer's melting point is 220° C., thermotropic behavior should be exhibited between 220° C. and 260° C.

The oligomer should also have a glass transition temperature at least 10° C. and preferably at least 25° C. above the glass transition temperature of the polymer. This enables the composition to exhibit a glass transition temperature higher than that of the polymer alone, and thus improve the dimensional stability of the composition.

Finally the oligomer and polymer should have monomers which enhance their compatability in a chemical sense even though the rod-like nature of the oligomer may prevent true compatibility, at least under equilibrium conditions. A convenient measure of mutual compatability of the two materials is the Small's solubility parameter calculated in accordance with the Small's Table of Molar Attraction Constants (P.A. Small, J. Appl. Chem., vol. 3, 71 (1973). An example of such a calculation is given in Example 31.

The nature and amount of the oligomer should be sufficient to improve the tensile modulus of the composition compared to the polymer alone, especially at high temperatures such as at the glass transition temperature of the polymer. While modulus may be measured by various techniques including tensile modulus (Instron Tensile Tester) or dynamic modulus (Dynamic Mechanical Analyzer), it is convenient to measure tensile modulus. In such a test, the modulus of the composition at the glass transition temperature of the polymer should be at least 110%, preferably at least about 125% and more preferably at least about 130%, of the corresponding value of the polymer alone. Such compositions will also exhibit smaller proportional increase in modulus at lower temperatures including room temperature, and increasingly greater proportional increases in modulus at higher temperatures.

The present invention is applicable to a broad spectrum of thermoplastic polymers of high molecular weight including polyesters, polyamides, polycarbonates, polyethers and poly(acetals). The only requirements are that the polymer have a glass transition temperature and a fusion temperature and act as an isotropic (non-liquid crystalline) liquid above its fusion point. In the case of crystalline polymers, the fusion temperature is referred to as the melting point of the polymer. The invention is particularly applicable to polyesters such as poly(alkylene terephthalate) polymers with alkylene of 2-4 carbons such as poly(ethylene terephthalate) (PET) and poly(butylene)terephthalate (PBT). It is also applicable to polyamides such as the well-known nylon-6, nylon-66 and the like, which can be constructed from aliphatic monomers which are either diacids or diamines, or are aminoacids, or have combinations of all three monomers.

Polyester oligomers are preferred, especially when the polymer is a polyester such as PET or PBT. Preferred polyester oligomers have monomers selected from those of the formulae:

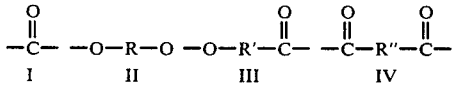

with the moles of I+IV=II and wherein R, R' and R" are each 1,4-phenylene, 2,5-naphthalene, 2,6-naphthalene, 1,4-cyclohexyl, 4,4'-biphenyl, 2,6-anthracene-9,10-dione or any of them substituted by alkyl, aryl, fluoro, chloro, bromo or alkoxy.

With polyamide polymers, preferred oligomers include N-substituted polyamides, polyesters, poly(ester amides) and poly(ether amides).

EXAMPLE 1

Preparation of poly(methyl hydroquinone terephthalate - co-2,6 naphthalene dicarboxylate)

A solution of methyl hydroquinone (248 g, 2 moles) and o-cresol (6.5 g, 0.06 mole) in pyridine (450 mL) and dichloromethane (1000 mL) was filtered and charged into a 12 liter reaction flask. In a separate flask was prepared a solution of 2,6 naphthalenedicarbonyl chloride (152 g, 0.6 mole) and terephthaloyl chloride (284 g, 1.4 moles) in a mixture of dichloromethane (3000 mL) and 1,2 dimethoxyethane (500 mL) by stirring under gentle reflux. The solution was filtered hot and the warm solution (38°–40° C.) was added dropwise with stirring to the first solution in the reaction flask. After the addition was complete (1 hour) the contents were left stirring for an additional period of two hours. The reaction mixture in the form of a slurry was added to excess isopropanol (6 liters) with good agitation. The precipitated oligomer was filtered, washed repeatedly with hot water, filtered and dried. Yield: 97%. The intrinsic viscosity [η] was about 0.4 dL/g measured in phenolTCE (60/40). The material melted at about 245°–270° C. as observed on a hot stage polarizing microscope. The melt exhibited thermotropic liquid crystallinity, i.e., showed birefringence under polarizing light and color bands and orientation upon shearing.

DSC analysis (heating rate =20° C./min) showed a broad melt endotherm at about 252° C. in the initial heat. The glass transition temperature upon reheating after quenching from 315° C. was about 86° C.

EXAMPLE 2

Following the general procedure of example 1, but decreasing the chain terminator (o-cresol) concentration to 5 g (0.05 mole), an oligomer of same composition but of intrinsic viscosity of about 0.6 dL/g was obtained. The oligomer melted at about 260°–290° C., forming a liquid crystalline melt. DSC analysis indicated a broad melting endotherm, in this initial heat, at 276° C. The glass transition temperature upon reheating after quenching from 315° C. was about 89° C.

Other examples of oligomers of the same composition were obtained by varying this chain terminator concentration. Table 1 summarizes the effect of reduced viscosity of the oligomer on the melt temperature (Tm, temperature at which complete fusion occurs)

TABLE 1

| MHQ-TPA/NDA (70/30) Oligomers | | |
|---|---|---|
| Example | η (dL/g) red | Tm (°C.) |
| 1 | 0.26 | 240 |
| 2 | 0.42 | 265 |
| 3 | 0.48 | 275 |
| 4 | 0.63 | 290 |
| 5 | 1 | 310 |

EXAMPLE 6

Poly(3,3',5,5' tetramethyl-4,4'-dihydroxybiphenyl—trimethylhydroquinone (50/50)—chloroterephthalate) (TMDB-TMHQ—ClTPA)

A mixture of 3,3', 5,5' tetramethyl-4,4'-dihydroxybiphenyl (242 g, one mole), trimethyl hydroquinone (152 g, 1 mole), 2,6-dimethylphenol (15 g, 0.125 mole), dichloromethane (3500 mL) and pyridine (800 mL) was stirred under nitrogen until a clear solution was obtained. The solution was filtered into a 12 liter reaction flask and then treated dropwise while stirring, with a solution of chloroterephthaloyl chloride (474 g, 1 mole) in dichloromethane (2000 ml). After the addition was complete (1 hour), the contents were left stirring overnight (18 hours). The thick slurry of this polymer was precipitated into isopropanol (15000 mL) with agitation. The precipitate was filtered, washed repeatedly with boiling water and dried under vacuum. Yield=98%. The reduced viscosity of the polymer was 0.68 dL/g. The material melted at about 280° C., when observed under hot stage microscope. The melt exhibited thermotropic liquid crystallinity under polarized light with characteristic birefringence and shear induced orientation and color band formation. DSC analysis indicated a glass transition temperature of about 120° C. upon reheating after quenching from 350° C. Two small and broad melt endotherms were observed at 250° and 290° C. respectively.

The general procedure of example 6 was used to obtain other examples of oligomers with reduced viscosities ranging from 0.27 to 1.3 dL/g by variation of chain terminator (2,6-dimethylphenol) concentration from 5 to 15 mole %. The melting temperature of these oligomers varied from about 210° C. to about 305° C. as shown in Table 2.

TABLE 2

TMDB-TMHQ (50/50) - ClTPA Oligomers

| Example | $\eta$ (dL/g) red | Tm (°C.) |
|---|---|---|
| 6 | 0.68 ($\overline{M}_w$ = 6000) | 240 |
| 7 | 0.27 | 210 |
| 8 | 0.5 | 255 |
| 9 | 1.1 | 295 |
| 10 | 1.3 ($\overline{M}_w$ = 13000) | 305 |

EXAMPLE 11

A solution of 3,3', 5,5' tetramethyl 4,4' dihydroxybiphenyl (235 g, 0.97 mole) and 2,6 dimethylphenol (10 g, 0.08 mole) in a mixture of pyridine (450 g) and dichloromethane (2000 g) was prepared by stirring under nitrogen. To this solution was added dropwise, with stirring, a solution of bromoterephthaloylchloride (275 g, 0.978 mole) in dichloromethane (1000 mL). After the addition was complete (1 hour), the stirring was continued for 3 hours. The contents were poured into 12 liters of methanol. The precipitate was filtered, washed and dried (yield=96%). The reduced viscosity of the oligomer was about 0.23 dL/g. The weight average molecular weight (Mw) was about 3200. The melt temperature was 290°-320° C., as observed on a hot stage microscope. The melt was birefringent and oriented upon shearing. DSC analysis indicated a glass transition temperature of about 115° C. upon reheating after quenching from 350° C.

Following the general procedure of example 11 a number of other oligomer samples of same composition but of different molecular weights were prepared by varying the chain terminator and monomer concentrations (Table 3).

| Example | $\eta$ red (dL/g) | Mw | Tm (°C.) |
|---|---|---|---|
| 11 | 0.21 | 3200 | 290-320 |
| 12 | 0.12 | 2000 | 215-240 |
| 13 | 0.18 | 2600 | 260-280 |
| 14 | 0.33 | 5000 | >340 with decomposition |
| 15 | 0.52 | 8620 | Infusible before decomposition |
| 16 | 0.6 | 10,000 | Infusible before decomposition |

EXAMPLE 17

Following the general procedure of example 11 a number of thermotropic oligomeric polyesters from 3,3', 5,5' tetramethoxy 4,4' dihydroxybiphenyl and bromoterephthaloyl chloride were prepared using 2,6-dimethoxyphenol as chain terminator. An oligomer of $[\eta]=0.13$ melted at 260°-280° C. while another oligomer of same composition but of $[\eta]=0.2$ melted at 280°-310° C. Both samples showed a glass transition temperature at 148° upon reheat after quenching from 350° C. Oligomers of $[\eta]=0.3$ or greater did not fuse below their decomposition temperature of about 350° C.

EXAMPLE 18

Melt spinning of PET and thermotropic oligomer blends

A 13% dry blend of PET powder (35-200 mesh) and the oligomer powder from example 1 was prepared in a Henschel mixer, dried at 160° C. and 0.1 mm Hg (13 Pa) for 18 hrs. The powder was then melt blended at 280° C. in a Sterling Extruder using a mixing screw (1" or 2.54 cm diameter, L/d=21). A modified tubular hopper with nitrogen attachment was used to facilitate the feeding of powders with minimal exposure to atmosphere. The extrudate was quenched in a water bath and pelletized. The blended pellets were redried at 160° C. for 18 h, and then melt spun at 265°-290° C. in the same extruder, using a 32 hole spinneret (0.053 cm diameter×0.106 cm capillary length) into a quench stack, while a heated sleeve (15 cm diameter×30 cm long) close to the die exit was used to maintain a wall temperature of 315° C. The yarn was taken up at speeds of about 280 m/min while the extrusion rates were typically 2 to 2.5 kg/h. Conventional polyester spin finish was applied to the yarn during the take up. The yarn was drawn 6 to 7.5:1 on a draw frame consisting of a toproller at 100° C., heated block at 185° C. and a bottom roller at 200° C. The drawn yarn was taken up at a speed of about 245 m/min. The final denier of the yarn was about 5 denier/fil.

The dispersed phase in the yarn was examined by transmission electromicroscopy on thin sections (cross section as well as longitudinal) obtained by embedding the yarn in Maraglas 4 epoxy and sectioning with an ultramicrotone. The dispersed phase was generally of the order of 20-300 nm and was found to be ellipsoidal in shape with an L/d=5. A third phase of higher electron density was also formed at the interface of the dispersed particles as well as a separate phase by itself. This was presumed to be either a dissolved phase or partially reacted phase consisting of both PET and the thermotropic oligomer compositions. In the case of PET blends with TMDB-TMHQ-ClTPA oligomer (from example 10) only two phases could be detected and the dispersed phase was smaller in size. The tensile properties of the blend yarns are summarized in Table 4. The initial modulus (at 0% strain) of PET is increased by 33% (Example 21) to 57% (example 22), by the addition of 13-14% thermotropic oligomer. The secant modulus of the blend yarns at higher strain levels (0.5 to 2%) were also higher than those of PET. The modulus improvement was also observed at higher temperatures; e.g for the yarn in example 18, the modulus at 150° C. was 65% higher than that of PET yarn. The shrinkage behavior of PET was considerably improved by about 50% thermotropic oligomer additive in example 18.

TABLE 4

TENSILE PROPERTIES OF PET AND THERMOTROPIC BLEND YARNS AT 23° C.

| Example* | Composition | UTS (gd$^{-1}$) | UE (%) | T.M. (gd$^{-1}$) at | | | |
|---|---|---|---|---|---|---|---|
| | | | | 0% | 0.5% | 1% | 2% strain |
| 18 | PET + 13% oligomer from example 2 | 6.92 | 10 | 189 | 172 | 133 | 96 |
| 19 | PET + 13% oligomer from example 2 | 6.7 | 9.7 | 198 | 170 | 140 | 93 |
| 20 | PET + 13% oligomer from example 3 | 7.4 | 8.5 | 205 | 175 | 140 | 105 |
| 21 | PET + 13% oligomer from example 3 | 7.44 | 9 | 187 | 185 | 157 | 113 |
| 22 | PET + 14% oligomer from example 3 | 6.5 | 8.5 | 220 | 180 | 150 | 110 |
| 23 | PET + 13% oligomer from example 6 | 7.6 | 9 | 209 | 175 | 145 | 107 |
| 24 | PET control ([η] = 0.71) | 8.1 | 12 | 140 | 130 | 110 | 79 |
| 25 | PET tire yarn ([η] = 0.86) | 8.5 | 15 | 130 | 130 | 110 | 75 |

*All spun at 282° C. except example 18 which was spun at 250° C.
UTS = ultimate tensile strength;
U.E. = ultimate elongation
T.M. = tensile modulus at room temperature measured in accordance with Example 26

EXAMPLE 26—MEASUREMENT OF TENSILE PROPERTIES

The tensile properties of the yarn (other than modulus) were determined in an Instron Tensile Tester at 50% relative humidity using a 12.7 cm gauge length and 2.27 kg full scale load and an extension rate of 100% per minute. The tensile modulus at 0% to 2% elongations were determined using expanded stress-strain curves obtained on the same instrument using a 0.908 kg full-scale load and the same stress rate and gauge length. The stress (g/denier) at these corresponding elongations was measured and divided by the percent elongation to obtain the modulus data.

EXAMPLE 27

The fibers of examples 18, 19, 23, 24 and 25 (the latter being a PET control and a commercial PET tire yarn) were placed in a constant temperature chamber at 23° C., 90° C., 120° C. and 150° C. and the tensile modulus was again measured as indicated in Example 25 with the 0.908 kg load. The results, displayed in Table 5, demonstrate the improved modulus retention of the fibers of the present invention, increasing proportionately above the approximately 70° C. glass transition temperature of PET.

TABLE 5

| Example | 23° C. | 90° C. | 120° C. | 150° C. |
|---|---|---|---|---|
| 18 | 189 | 103 | 47 | 22 |
| 19 | 197 | 89 | — | 21 |
| 23 | 209 | 87 | — | 15.6 |
| 24 | 140 | 75 | — | 9.1 |
| 25 | 130 | 76 | — | 8.5 |

EXAMPLE 28

The fibers of Examples 17 and 22 (the latter being a PET Control) were clamped in a Perkin Elmer thermomechanical analyzer in a helium atmosphere at nominal load and heated at 10° C./min. The length of the fiber was recorded and is indicated in Table 6 as a percent shrinkage.

TABLE 6

Shrinkage Behavior of PET and PET Thermotropic Oligomer Blend Yarns
Analytical Method - Thermomechanical Analysis (TMA) at Zero Load (Nominal) and at a heating rate = 10° C./min

| T (°C.) | % Shrinkage PET Control (Example 22) | % Shrinkage PET & Oligomer Blend (Example 17) |
|---|---|---|
| 40 | 0 | 0 |
| 50 | 0 | 0 |
| 60 | 0 | 0 |
| 70 | 0 | 0 |
| 80 | 0.06 | 0 |
| 90 | 0.19 | 0 |
| 100 | 0.52 | 0.13 |
| 110 | 1 | 0.58 |
| 120 | 2.4 | 1.1 |
| 130 | 4.3 | 2 |
| 140 | 5.9 | 2.8 |
| 150 | 7.7 | 3.7 |
| 160 | 9.5 | 4.7 |
| 170 | 11.6 | 5.7 |
| 180 | 14.4 | 6.8 |
| 190 | 17.4 | 7.9 |
| 200 | 20.6 | 9.4 |
| 210 | 23.9 | 11 |
| 220 | 32.3 | 14.5 |

EXAMPLE 29

Preparation of Poly(t-butyl hydroquinoneco-methylhydroquinone (50/50) terephthalate)

(t-BuHQ-MHQ (50/50%)—TPA)

A Solution of t-butyl hydroquinone (664 g, 4 moles), methyl hydroquinone (488 g, 4 moles) and 2-t-butylphenol (35 g, 0.23 mole) in pyridine (1600 mL) was treated with a solution of terephthaloyl chloride (1624 g, 8 moles) in dichloromethane (10.5 liters) by dropwise addition with vigorous stirring. After the addition was complete in about 2.5 hours, the contents were left stirring for an additional period of 18 hours. Then the reaction mixture was precipitated into 30 liters of acetone-water mixture (7:1) in a stirred tank. The precipitated oligomer was filtered, washed successively with aqueous acetone (30 liters) hot water (40 liters, 3 times) and finally dried under vacuum at 120° C./0.5 mm Hg. The yield was 80%; the reduced viscosity of the oligomer was 0.3 dL/g. The material softened at 250° C. and melted at about 270° C. The melt exhibited thermotropic liquid crystallinity under polarized light. DSC analysis indicated a broad melting endotherm centered around 242° C. Reheating after quenching from 300° C. showed a $T_g=140°$ C. and $T_m=250°$ C., 285° C.$[\eta]=0.27$. This material is expected to provide improved modulus values when blended with poly(ethylene terephthalate).

EXAMPLE 31

Small's Solubility Parameters

Employing Small's Table of Molar Attraction Constants, the parameters for poly(ethylene terephthalate) and the oligomer of Example 1 were calculated. PET has a density of 1.33 and a molecular weight of repeat unit of 192, and thus a molar volume of 144. The oligomer has a density of about 1.4, a molecular weight of repeat unit of 269 and thus a molar volume of about 192.

| Group | | F (Molar Attractive Constant) |
|---|---|---|
| 2-CH$_2$— | 2 × 133 | 266 |
| phenyl | | 658 |
| 2 COO— | 2 × 310 | 620 |
| | | 1544 ÷ 144 = 10.7 for PET |
| —CH$_3$ | | 214 |
| 1.7 phenyl | 1.7 × 658 | 1118.6 |
| 2 COO— | 2 × 310 | 620 |
| 0.3 naphthyl | 0.3 × 1146 | 344 |
| | | 2296.6 ÷ 192 = 11.96 for oligomer |

The difference in parameters is 1.26 or less than 2.

We claim:

1. A thermoplastic composition comprising:
   (a) a thermoplastic polymer of high molecular weight selected from the group consisting of polyesters, polyamides, polycarbonates and polyacetals which has a fusion temperature at a first temperature, has a glass transition temperature and forms an isotropic liquid above the first temperature, and
   (b) dispersed in said thermoplastic polymer a polyester oligomer having a melting point at a second temperature, said second temperature being not more than 50° C. less than said first temperature nor more than 70° C. more than said first temperature; said oligomer exhibiting nematic behavior between said second temperature and a third temperature, said third temperature being at least 30° C. above said second temperature and at least about 10° C. above said first temperature; said oligomer having a number average length/diameter ratio (L/D) of between 10 and 50, a glass transition temperature at least 10° C. greater than the glass transition temperature of said polymer and a Small's solubility parameter within 2 of the Small's solubility parameter of said polymer;
   the amount of said oligomer being sufficient to raise the modulus value of the thermoplastic composition to at least 110% of the corresponding value of the polymer at the glass transition temperature of said polymer.

2. The thermoplastic composition of claim 1 wherein said thermoplastic polymer is a poly(alkylene arylate).

3. The thermoplastic composition of claim 2 wherein said thermoplastic polymer is a poly(alkylene terephthalate), said alkylene having 2-4 carbons.

4. The thermoplastic composition of claim 3 wherein said thermoplastic polymer is poly(ethylene terephthalate).

5. The thermoplastic composition of claim 3 wherein said thermoplastic polymer is poly(butylene terephthalate).

6. The thermoplastic composition of claim 3 wherein said oligomer is a polyester having residues selected from:

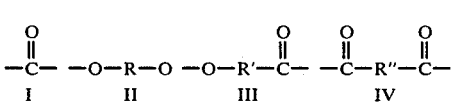

with the moles of I+IV=II and wherein R, R' and R" are each 1,4-phenylene, 2,5-naphthalene, 2,6-napththalene 1,4-cyclohexyl, 4,4'-biphenyl, 2,6-anthracene-9,10-dione or any of them substituted by alkyl, aryl, fluoro, chloro, bromo or alkoxy.

7. The thermoplastic composition of claim 6 wherein said residues are terephthaloyl or substituted terephthaloyl, substituted hydroquinone and an additional biphenol wherein R is 4,4'-biphenyl or hydroquinone, each unsubstituted or substituted by methyl, chloro or t-butyl.

8. The thermoplastic composition of claim 6 wherein said residues are carbonyl, terephthaloyl and substituted hydroquinone.

9. The thermoplastic composition of claim 6 wherein said residues are substituted terephthaloyl, substituted 4,4'-dihydroxybiphenyl and substituted hydroquinone.

10. The thermoplastic composition of claim 6 wherein said residues are terephthaloyl, 2,6-naphthalenedicarboxyl and substituted hydroquinone.

11. The thermoplastic composition of claim 10 wherein said substituted hydroquinone is methylhydroquinone.

12. The thermoplastic composition of claim 1 wherein the glass transition temperature of said oligomer is at least 20° C. greater than that of said polymer.

13. The thermoplastic composition of claim 12 wherein said polymer is poly (alkylene terephthalate), said alkylene having 2-4 carbons.

14. The thermoplastic composition of claim 1 wherein said polymer is a polyamide.

15. The thermoplastic composition of claim 14 wherein said polymer has residues of the formula:

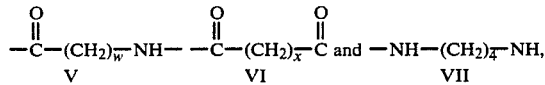

wherein w, x and y are each independently integers from 4 to 16 and wherein the moles of V equal the moles of VII.

16. The thermoplastic composition of claim 14 wherein said oligomer is a polyamide which is at least partially N-substituted.

17. The thermoplastic composition of claim 14 wherein said oligomer is a thermotropic polyester.

18. The thermoplastic compositions of claim 14 wherein said oligomer is a thermotropic poly(ester amide).

19. The thermoplastic composition of claim 14 wherein said oligomer is a thermotropic poly(ether amide).

20. The thermoplastic composition of claim 1 wherein said second temperature is not more than 20° C. more than said first temperature.

* * * * *